F. C. Miller.
Domestic Oven.
N° 78,226. Patented May 26, 1868.
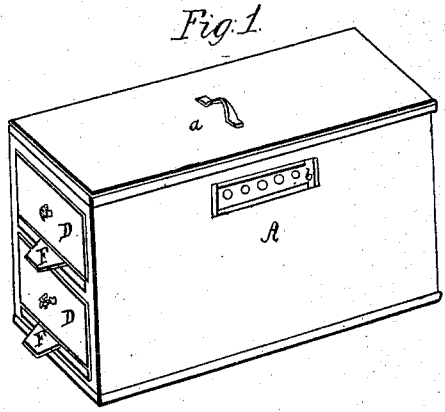
Fig. 1.
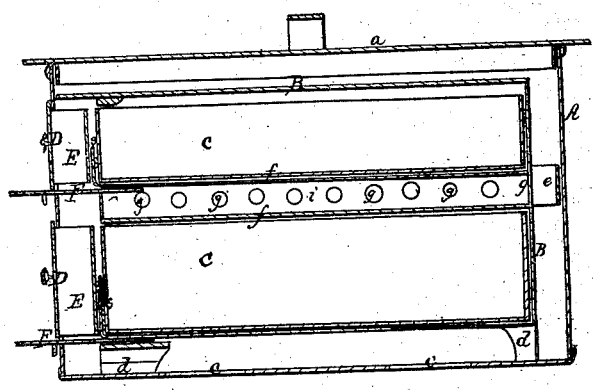
Fig. 2.
Fig. 3
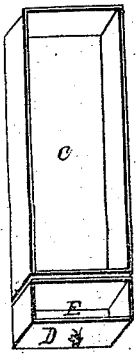
Fig. 4.
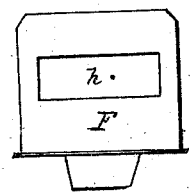
Witnesses:
Inventor:
F. C. Miller
by J. Fraser & Co
Atty.

United States Patent Office.

F. C. MILLER, OF EVANS CENTRE, NEW YORK.

Letters Patent No. 78,226, dated May 26, 1868.

---

IMPROVEMENT IN PORTABLE OVENS.

---

The Schedule referred to in these Letters Patent and making part of the same.

---

TO ALL WHOM IT MAY CONCERN:

Be it known that I, F. C. MILLER, of Evans Centre, in the county of Erie, and State of New York, have invented a new and useful Improvement in Bakers; and I do hereby declare that the following is a full and exact description thereof, reference being had to the accompanying drawings, in which—

Figure 1 is a perspective view of my invention.
Figure 2, a longitudinal vertical section.
Figure 3 shows one of the bake-pans detached.
Figure 4 is one of the slides.

Like letters of reference designate corresponding parts in all the figures.

My invention consists in the combination, with an enclosed baking-chamber, having a central space, of pans made up of two parts, which may be separated, the one part allowing a free passage of hot air or steam by means of slides, as hereinafter set forth.

In the drawings, A indicates the outer metal case or jacket for retaining the heat, having a tight cover, $a$, and provided at each side, near the top, with a series of holes covered with a slide, $b$, to act as a regulator when steam is used.

The front of this outer case has openings to admit drawers or pans C C, of which any suitable number may be used, according to the size of the oven.

The bottom of this case is provided with openings, $c\ c$, to admit steam, when used as a steamer, or to be set over the open griddles of an ordinary cook-stove, when desired.

If steam is to be used, it is set in any suitable pan containing water.

B represents the inner case or oven, which stands on feet $d\ d$, and has projections $e$, to keep it at a sufficient distance from the outer case, to allow the heated air or steam to entirely surround it. It is provided with partitions $f\ f$, running longitudinally through its centre, with space $i$ between, over which sets the upper bake-pan, and under it the other. There may be as many of these hollow partitions used as desired, or the size of the oven will allow. These hollow partitions do not come out flush with the front of the case, but are fixed so as to have a space in front to allow the heat to rise in front of the bake-pans. $g\ g\ g$ represent holes in the sides and back of inner oven, to admit heat or steam under and over bake-pans into space $i$. Bake-pans C C are preferably made with flaring sides, for convenience in taking out bread, &c. These pans are just the length of the partitions, and the width of the inside of the inner oven. To each of these pans is attached a false front or frame, D. There is an open space, E, between these fronts and the end of the pans, to allow the heat to ascend freely. These fronts are made to overlap and fit tightly to the outer case or jacket. They are each connected with the front of the pans by a lip, $s$, which sets on a corresponding lip, $s'$, on the front of the bake-pan.

These fronts are detached from the pans when any of the latter are not needed, and are then set independently in their places in the outer case, to stop the opening and confine the heat from escaping outward.

F F are slides, which are inserted under each of the bake-pans and fronts D, each having an oblong opening, $h$, fig. 4, corresponding with the spaces E E, between the bake-pans C C, and false fronts D D. These slides, when partly pulled out, bring their openings $h\ h$, where the spaces E E are, and allow the free passage upwards of the heat or steam from the bottom of the oven. When pushed entirely in, they severally shut off the heat from the front of pans above them.

If desired to use one and not the other bake-pan, it is done by pulling out the slide underneath the one used, and taking out the other pans, but keeping the false fronts in the outer case.

By this construction and arrangement of the apparatus, I am enabled to surround the enclosed chamber B by a layer of hot air or steam, also to admit it in the space $i$, between the pans, and furthermore, to gauge its passage up over the pans by slides F. The advantages of these slides F F are that they allow, when pulled out, the heat or steam to rise in front of the pans, as before stated, thereby having an equal heat diffused, permitting the uniform baking of bread, &c., and thereby doing away with the difficulty of ordinary ovens, of having to take out what is being baked and turn it. They also graduate the heat by being partly pulled out or partly pushed in.

This method of surrounding the oven, of admitting hot air between the section, and of gauging the flow over the pans, has never before been accomplished, so far as I am aware.

The making of the pans in two sections C D, so as to be separated at pleasure, and the forming of the parts D in skeleton or open form, to allow the passage of hot air, I also believe to be original with myself.

What I claim as my invention, and desire to secure by Letters Patent, is—

The combination, with the chamber B, provided with central heating-space $i$, and surrounded by jacket A, of the pans made up of two parts, C D, the latter being detached, and in skeleton or open form, for allowing a free passage of air or steam, and covered by slides F, the whole operating in the manner and for the purpose herein set forth.

In witness whereof, I have hereunto signed my name in the presence of two subscribing witnesses.

F. C. MILLER.

Witnesses:
SAMUEL LAKE,
J. R. DRAKE